(12) United States Patent
Hayashi

(10) Patent No.: US 7,545,759 B2
(45) Date of Patent: Jun. 9, 2009

(54) HIGH-FREQUENCY SWITCHING MODULE AND ITS CONTROL METHOD

(75) Inventor: Kenji Hayashi, Saitama-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 540 days.

(21) Appl. No.: 10/549,451

(22) PCT Filed: Feb. 16, 2005

(86) PCT No.: PCT/JP2005/002345

§ 371 (c)(1),
(2), (4) Date: Sep. 14, 2005

(87) PCT Pub. No.: WO2005/122417

PCT Pub. Date: Dec. 22, 2005

(65) Prior Publication Data
US 2006/0245382 A1 Nov. 2, 2006

(51) Int. Cl.
*H04L 5/00* (2006.01)
(52) U.S. Cl. .............................. 370/295; 455/82; 455/83
(58) Field of Classification Search ........................ None
See application file for complete search history.

(56) References Cited

U.S. PATENT DOCUMENTS 6,606,015 B2 * 8/2003 Uriu et al. .................. 333/132
6,768,898 B2 * 7/2004 Furutani et al. ............... 455/82
6,975,841 B2 * 12/2005 Uriu et al. ...................... 455/78
7,057,472 B2 * 6/2006 Fukamachi et al. .......... 333/101

FOREIGN PATENT DOCUMENTS

| JP | 2002-198854 | 7/2002 |
|---|---|---|
| JP | 2004-007408 | 1/2004 |
| WO | WO 0055983 | 9/2000 |

* cited by examiner

*Primary Examiner*—Phuc H Tran
(74) *Attorney, Agent, or Firm*—Sughrue Mion, PLLC

(57) ABSTRACT

A method for controlling a high-frequency switching module comprising a diplexer comprising first and second filter circuits F1, F2 for dividing signals received by an antenna to a receiving signal of a first transmitting/receiving system and a receiving signal of second and third transmitting/receiving systems, a first switching circuit SW1 disposed downstream of the first filter circuit F1 for switching a transmitting circuit TX1 and a receiving circuit RX1 of the first transmitting/receiving system by voltage applied from a control circuit VC1, and a second switching circuit SW2 disposed downstream of the second filter circuit F2 for switching a transmitting circuit TX2 of the second and third transmitting/receiving systems, a receiving circuit RX2 of the second transmitting/receiving system and a receiving circuit RX3 of the third transmitting/receiving system by voltage applied from control circuits VC2, VC3, the method comprising applying a positive voltage from the control circuit VC1 to the first switch circuit SW1 to connect the transmitting circuit TX1 of the first transmitting/receiving system to the antenna, and applying a positive voltage from the control circuit VC3.

7 Claims, 6 Drawing Sheets

HIGH-FREQUENCY SWITCHING MODULE AND ITS CONTROL METHOD

FIELD OF THE INVENTION

The present invention relates to a high-frequency composite part for use in wireless communications equipments (cell phones, etc.) usable for different communications systems, particularly to a high-frequency switching module for use in wireless communications equipments handling three or more communications systems.

BACKGROUND OF THE INVENTION

There are various mobile wireless systems using a time division multiple access (TDMA), for instance, EGSM (extended global system for mobile communications) and DCS (digital cellular system) widely used mostly in Europe, PCS (personal communication service) widely used in the U.S., and PDC (personal digital cellular system) used in Japan. According to recent rapid expansion of mobile phones, however, a frequency band allocated to each system cannot allow all users to use their mobile phones in major cities in advanced countries, resulting in difficulty in connection and thus causing such a problem that mobile phones are sometimes disconnected during communication. Thus, proposal was made to permit users to utilize a plurality of systems, thereby increasing substantially usable frequencies, and further to expand serviceable territories and to effectively use communications infrastructure of each system.

Proposed as a small, lightweight high-frequency circuit part capable of handling pluralities of communications systems is a triple-band high-frequency switching module capable of handling three systems of EGSM, DCS and PCS, which is usable for portable communications equipments (WO 00/55983). FIG. 5 is a block diagram showing the triple-band, high-frequency switching module of WO 00/55983, and FIG. 6 is a view showing its equivalent circuit, though the reference numerals of control terminals are changed for convenience. This high-frequency switching module for switching three transmitting/receiving systems comprises (a) a diplexer comprising first and second filter circuits F1, F2 for viding a signal received by an antenna ANT to a receiving signal of the first transmitting/receiving system and a receiving signal of the second and third transmitting/receiving systems, (b) a first switching circuit SW1 downstream of the first filter circuit F1 for switching a transmitting circuit TX1 and a receiving circuit RX1 of the first transmitting/receiving system by voltage applied from a control circuit VC1, and (c) a second switching circuit SW2 disposed downstream of the second filter circuit F2 for switching a transmitting circuit TX2 of the second and third transmitting/receiving systems, a receiving circuit RX2 of the second transmitting/receiving system and a receiving circuit RX3 of the third transmitting/receiving system by voltage applied from control circuits VC2, VC3. This reference exemplifies a case where the first communications system is EGSM (transmitting frequency: 880-915 MHz, receiving frequency: 925-960 MHz), the second communications system is DCS (transmitting frequency: 1710-1785 MHz, receiving frequency: 1805-1880 MHz), and the third communications system is PCS (transmitting frequency: 1850-1910 MHz, receiving frequency: 1930-1990 MHz). The operation of the first to third control circuits and diode switches will be explained below.

(A) DCS/PCS TX Mode

When the second/third transmitting circuit TX2 is connected to the second filter circuit F2, a positive voltage is applied from the control circuit VC2, and a zero voltage is applied from the control circuit VC3. The positive voltage applied from the control circuit VC2 is deprived of a DC component by capacitors CP2, CP3, CP4, CP5, CP6 and CF4 and applied to a circuit comprising diodes DP1, DP2, so that the diodes DP1, DP2 are turned on. When the diode DP1 is turned on, impedance is lowered between the second/third transmitting circuit TX2 and the input/output terminal IP2. The turned-on diode DP2 and capacitor CP6 make the transmission line LP2 grounded at high frequencies and thus resonated, extremely increasing the impedance of the output terminal IP3 viewed from the input/output terminal IP2. Further, the turned-off diode DD2 increases impedance between the output terminal IP3 and the third receiving circuit RX3. As a result, a transmitting signal from the second/third transmitting circuit TX2 is transmitted to the second filter circuit F2 without leaking to the second and third receiving circuits RX2, RX3.

(B) DCS RX Mode

When the second receiving circuit RX2 is connected to the second filter circuit F2, a zero voltage is applied from the control circuits VC2, VC3, so that the diodes DP1, DP2, DD1 and DD2 are turned off. The turned-off diode DP1 increases impedance between the input/output terminal IP2 and the second/third transmitting circuit TX2. Also, the turned-off diode DD2 increases impedance between the output terminal IP3 and the third receiving circuit RX3. The input/output terminal IP2 is thus connected to the second receiving circuit RX2 via the transmission lines LP2 and LD1. As a result, a receiving signal from the second filter circuit F2 is transmitted to the second receiving circuit RX2 without leaking to the second/third transmitting circuit TX2 and the third receiving circuit RX3.

(C) PCS RX Mode

When the third receiving circuit RX3 is connected to the second filter circuit F2, a positive voltage is applied from the control circuit VC3, and a zero voltage is applied from the control circuit VC2. The positive voltage from the control circuit VC3 is deprived of a DC component by capacitors CDP1, CDP2, CDP3 and CP5, and applied to a circuit comprising the diodes DD1, DD2, so that the diodes DD1 and DD2 are turned on. The turned-on diode DD2 decreases impedance between the third receiving circuit RX3 and the output terminal IP3. Also, the turned-on diode DD1 and capacitor CDP2 make the transmission line LD1 grounded at high frequencies and thus resonated, extremely increasing the impedance of the second receiving circuit RX2 viewed from the output terminal IP3. Further, the turned-off diode DP1 increases impedance between the input/output terminal IP2 and the second/third transmitting circuit TX2. As a result, a receiving signal from the second filter circuit F2 is transmitted to the third receiving circuit RX3 without leaking to the second/third transmitting circuit TX2 and the second receiving circuit RX2.

(D) EGSM RX Mode

When the first receiving circuit RX1 is connected to the first filter circuit F1, a zero voltage is applied from the control circuit VC1 to turn off the diodes DG1 and DG2. With the diode DG2 turned off, the input/output terminal IP1 is connected to the first receiving circuit RX1 via the transmission line LG2. The turned-off diode DG1 increases impedance between the input/output terminal IP1 and the first transmitting circuit TX1. As a result, a receiving signal from the first filter circuit F1 is transmitted to the first receiving circuit RX1 without leaking to the first transmitting circuit TX1.

(E) EGSM TX Mode

When the first transmitting circuit TX1 is connected to the first filter circuit F1, a positive voltage is applied from the control circuit VC1. The positive voltage is deprived of a DC component by capacitors CG6, CG5, CG4, CG3, CG2 and CG1, and applied to a circuit comprising the diodes DG2 and DG1, so that the diodes DG2 and DG1 are turned on. The turned-on diode DG1 decreases impedance between the first transmitting circuit TX1 and the input/output terminal IP1. The turned-on diode DG2 and capacitor CG6 make the transmission line LG2 grounded at high frequencies and thus resonated, extremely increasing the impedance of the first receiving circuit RX1 viewed from the input/output terminal IP1. As a result, a transmitting signal from the first transmitting circuit TX1 is transmitted to the first filter circuit F1 without leaking to the first receiving circuit RX1.

The above control logic is summarized in Table 1. Thus, one mode of the first to third transmitting/receiving systems is selected by controlling the ON/OFF states of diodes in the switching circuit by voltage applied from control circuits.

TABLE 1

| Mode | VC1 | VC2 | VC3 |
| --- | --- | --- | --- |
| EGSM TX (Transmitting) | High | Low | Low |
| DCS/PCS TX (Transmitting) | Low | High | Low |
| EGSM RX (Receiving) | Low | Low | Low |
| DCS RX (Receiving) | Low | Low | Low |
| PCS RX (Receiving) | Low | Low | High |

In the high-frequency switching module, insertion loss is preferably as small as possible, because it affects the battery lives of cell phones in a transmitting mode, and receiving sensitivity in a receiving mode. Harmonics are also preferably as small as possible to reduce unnecessary power consumption in each system. It is particularly important to limit a second harmonic. Attenuation is preferably, for instance, −35 dB or more in EGSM and −25 dB or more in DCS/PCS. Various measures have conventionally been taken to suppress harmonics, but a measure conducted at present is to optimize the characteristics of a lower-frequency filter in a diplexer or a transmitting lowpass filter in a high-frequency switching module, thereby improving the attenuation by several tenth of dB. However, such measure has limitations, failing to obtain higher attenuation of harmonics than the above level.

OBJECTS OF THE INVENTION

Accordingly, an object of the present invention is to provide a high-frequency switching module and its control method having a high harmonics-attenuating level.

Another object of the present invention is to provide a small, lightweight high-frequency switching module formed in and on one laminate such that it is easily arranged in a cell phone.

DISCLOSURE OF THE INVENTION

As a result of intense research in view of the above objects, the inventors have paid attention to the characteristics of diode switches and a logic for controlling their ON/OFF, finding that the selection of one mode by applying voltage from two control circuits of two switching circuits in a high-frequency switching module leads to control with a high attenuation of harmonics. The present invention has been completed based on such finding.

The method of the present invention for controlling a high-frequency switching module comprising a diplexer comprising first and second filter circuits F1, F2 for dividing signals received by an antenna to a receiving signal of a first transmitting/receiving system and a receiving signal of second and third transmitting/receiving systems, a first switching circuit SW1 disposed downstream of the first filter circuit F1 for switching a transmitting circuit TX1 and a receiving circuit RX1 of the first transmitting/receiving system by voltage applied from a control circuit VC1, and a second switching circuit SW2 disposed downstream of the second filter circuit F2 for switching a transmitting circuit TX2 of the second and third transmitting/receiving systems, a receiving circuit RX2 of the second transmitting/receiving system and a receiving circuit RX3 of the third transmitting/receiving system by voltage applied from control circuits VC2, VC3, the method comprising applying a positive voltage from the control circuit VC1 to the first switching circuit SW1 to connect the transmitting circuit TX1 of the first transmitting/receiving system to the antenna, and applying a positive voltage from the control circuit VC3 of the second switching circuit SW2.

Though a positive voltage is applied as a control voltage as described above, the same control would be able to be conducted by applying a negative voltage as a control voltage if the polarities of the above diodes were reversed. Accordingly, "applying a positive voltage" includes a case where "a negative voltage is applied by reversing the polarities of diodes."

The high-frequency switching module of the present invention comprises a diplexer comprising first and second filter circuits F1, F2 for dividing signals received by an antenna to a receiving signal of a first transmitting/receiving system and a receiving signal of second and third transmitting/receiving systems, a first switching circuit SW1 disposed downstream of the first filter circuit F1 for switching a transmitting circuit TX1 and a receiving circuit RX1 of the first transmitting/receiving system by voltage applied from a control circuit VC1, and a second switching circuit SW2 disposed downstream of the second filter circuit F2 for switching a transmitting circuit TX2 of the second and third transmitting/receiving systems, a receiving circuit RX2 of the second transmitting/receiving system and a receiving circuit RX3 of the third transmitting/receiving system by voltage applied from control circuits VC2, VC3;

the first switching circuit SW1 comprising an input/output terminal IP1 for inputting a receiving signal of the first transmitting/receiving system and outputting a transmitting signal, a connecting terminal P13 for inputting a transmitting signal from the transmitting circuit TX1 of the first transmitting/receiving system, a connecting terminal P16 for outputting a receiving signal of the first transmitting/receiving system to a receiving circuit RX1, a first diode DG1 disposed between the input/output terminal IP1 and the connecting terminal P13, a first inductance element LG1 disposed between the connecting terminal P13 and a ground, a second inductance element LG2 disposed between the input/output terminal IP1 and the connecting terminal P16, and a second diode DG2 disposed between the connecting terminal P16 and the ground;

the second switching circuit SW2 comprising an input/output terminal IP2 for inputting a receiving signal of the second and third transmitting/receiving systems and outputting a transmitting signal, a connecting terminal P7 for inputting a transmitting signal from the transmitting circuit TX2 of the second and third transmitting/receiving systems, an output terminal IP3 for outputting a receiving signal of the second and third transmitting/receiving systems, a connecting terminal P9 for outputting a receiving signal of the second transmitting/receiving system to a receiving circuit RX2, a connecting terminal P10 for outputting a receiving signal of the third transmitting/receiving system to a receiving circuit RX3, a third diode DP1 disposed between the input/output terminal IP2 and the connecting terminal P7, a third inductance element LP1 disposed between the connecting terminal P7 and the ground, a fourth inductance element LP2 disposed between the input/output terminal IP2 and the output terminal IP3, a fourth diode DP2 disposed between the output terminal IP3 and the ground, a fifth inductance element LD1 disposed between the output terminal IP3 and the connecting terminal P9, a fifth diode DD1 disposed between the connecting terminal P9 and the ground, a sixth diode DD2 disposed between the output terminal IP3 and a connecting terminal P10, and a sixth inductance element LD2 disposed between the connecting terminal P10 and the ground;

The transmitting circuit TX1 of the first transmitting/receiving system being connected to the input/output terminal IP1 by turning on the first diode DG1, the second diode DG2, the fifth diode DD1 and the sixth diode DD2.

In the high-frequency switching module of the present invention, it is preferable to adjust the constant of the sixth inductance element LD2 and the impedance of the receiving circuit RX3 of the third transmitting/receiving system to control the impedance of the antenna terminal near a frequency band of the receiving circuit RX3 (corresponding to a second harmonic band to be attenuated at the first transmitting). What should be done to achieve this purpose is only to adjust a length and a thickness, for instance, in the case of a transmission line, and inductance in the case of an inductor.

It is preferable in the high-frequency switching module of the present invention that the diplexer is constituted by an LC circuit, that the first and second switching circuits are constituted by switching elements, that each transmitting part of the switching circuits comprises a lowpass filter constituted by an LC circuit, that at least part of the LC circuit of the diplexer, the LC circuit of the lowpass filter and the inductance elements of the switching circuits are constituted by electrode patterns formed on dielectric layers forming a laminate, and that chip elements constituting part of the switching elements and the LC circuits are mounted onto the laminate. The above switching element may be a diode, a field effect transistor, etc.

The high-frequency switching module of the present invention preferably further comprises a high-frequency amplifier integrally formed in the laminate; the high-frequency amplifier comprising at least a semiconductor element, a voltage-supplying circuit and a matching circuit; at least part of inductance elements constituting the voltage-supplying circuit and the matching circuit and the LC circuits being constituted by electrode patterns formed on the dielectric layers; and chip elements constituting part of the semiconductor elements and the LC circuits being mounted onto the laminate.

The above inductance elements are preferably transmission lines or inductors formed by electrode patterns, or chip inductors mounted onto the laminate.

BEST MODE FOR CARRYING OUT THE INVENTION

Figure 1:
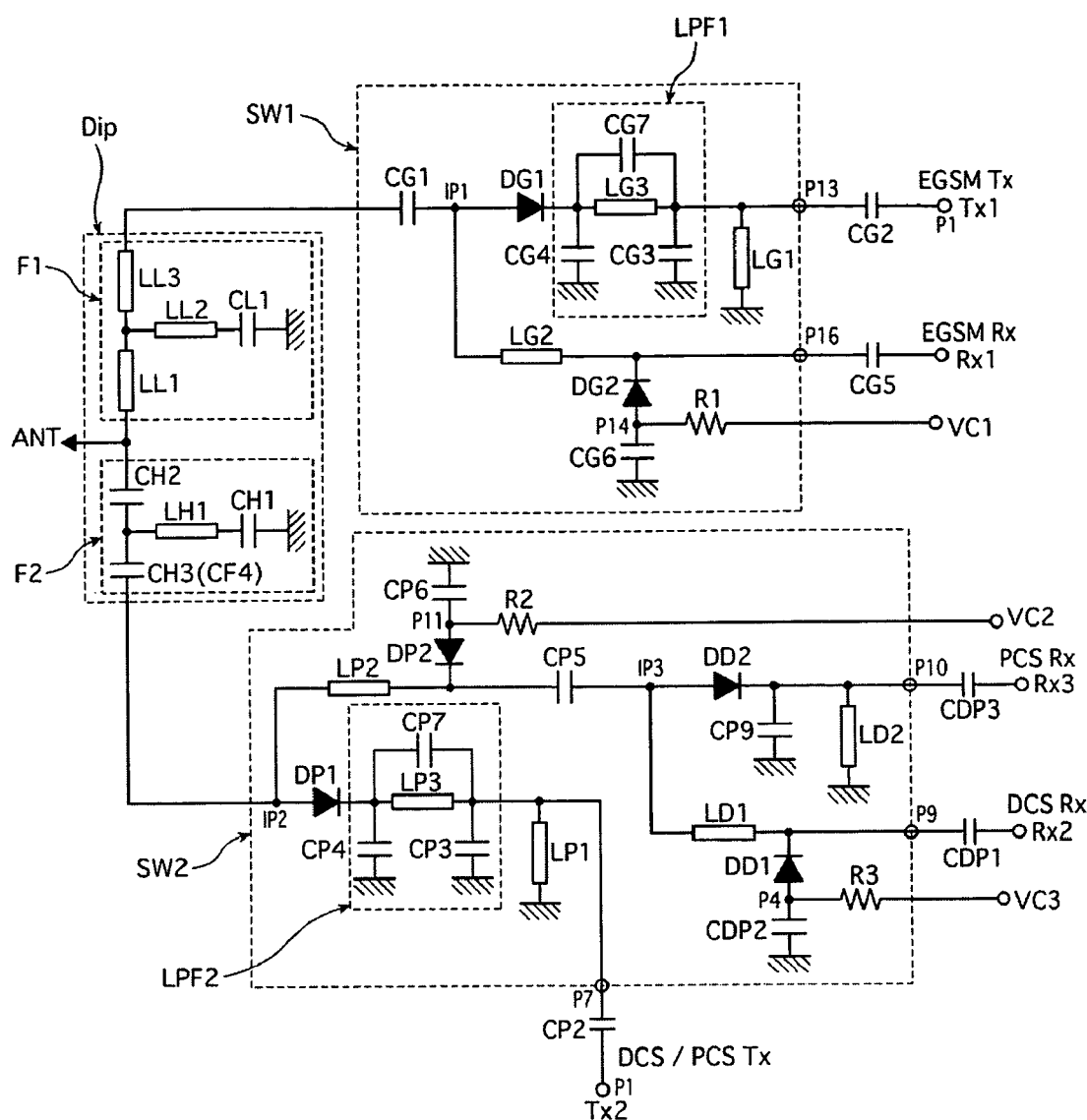
FIG. 1 is a view showing an equivalent circuit of an example of the high-frequency switching module of the present invention.

While the selection of one mode is conducted by voltage control by one control circuit in a conventional control method of a high-frequency switching module, the control method of a high-frequency switching module according to the present invention carries out the selection of one mode by applying voltage from control circuits of two switching circuits, for instance, EGSM and DCS/PCS. Namely, the control method of the present invention conducts voltage control from both directions. Referring to Table 2, this is a control logic in which a positive voltage is applied from a control circuit VC1 of a first switching circuit SW1 and a control circuit VC3 of a second switching circuit SW2 at the time of an EGSM TX transmitting mode. At this time, diodes (DG1, DG2) constituting the first switching circuit SW1 and diodes (DD1, DD2) controlled by one control circuit in the second switching circuit SW2 are turned on. Because a diode in an OFF state generally generates harmonic distortion, harmonics can be suppressed by turning on diodes in the second switching circuit as described above. This is one of the important features of the present invention.

Another feature of the present invention is that a second harmonic is largely attenuated at the EGSM TX transmitting mode. One of reasons therefor is that the control method of the present invention has a different equivalent circuit at as high frequencies as DCS and PCS from that of the conventional control method. In the conventional control logic, the second control circuit VC3 is not controlled when voltage is applied to the first control circuit VC1 for switching to the EGSM TX transmitting mode. Accordingly, connection is achieved from a second filter circuit F2 to a DCS RX terminal in the DCS/PCS circuit by transmission lines LP2 and LD1. Namely, when the terminals of DCS and PCS are viewed from an antenna terminal, there looks as if the DCS RX receiving terminal is directly connected to the antenna via transmission lines. In the circuits of DCS and PCS in this state, a second harmonic near a GSM band is not substantially attenuated. In the control logic of the present invention, on the other hand, diodes (DD1, DD2) are turned on, because a positive voltage is applied from the second control circuit VC3 at the same time of applying voltage to the first control circuit VC1 to switch to an EGSM TX transmitting mode. Accordingly, in the circuits of DCS and PCS downstream of the second filter circuit F2 with the transmission line LP2 communicated, the DCS RX path is short-circuited at high frequencies by a transmission line LD1, and the PCS RX path is communicated while being short-circuited by the transmission line LD2. Namely, when the terminals of DCS and PCS are viewed from the antenna terminal, the DCS RX path is substantially open (high impedance), and the PCS RX path is communicated with a λ/4 resonance circuit of the transmission line LP2 and the transmission line LD2 connected. The transmission line LP2 is as long as about ¼ of the wavelength of the DCS band, and the transmission line LD2 is as long as about ¼ of the wavelength of the PCS band. The DCS band and the PCS band have substantially the same wavelength, about ½ of the wavelength of the GSM band. In this state, the PCS circuit short-circuits the second harmonic of the EGSM band, thereby attenuating the second harmonic and nearby frequencies of EGSM.

Another reason is that the impedance of a second harmonic band of GSM is adjusted at the antenna terminal. Transmitting characteristics between terminals are generally equivalent to impedance viewed from each terminal. In the present invention, each impedance viewed from an antenna terminal and a GSM TX transmitting terminal affects the transmitting characteristics. Accordingly, to improve the transmitting characteristics, each impedance is controlled by adjusting circuits between terminals. However, because the antenna terminal is connected to the terminals of other paths, it is likely to be affected by the impedance of other paths. Of course, as described above, attempts have been made to eliminate an adverse effect of the impedance of other paths on the antenna terminal by turning unnecessary paths and terminals open (high impedance) by devising a circuit design and an operation mode. In the conventional control method, the impedance of the paths of GSM TX (TX1) and DCS RX (RX2) viewed from the antenna is 50 Ω at an EGSM TX transmitting mode, resulting in a not-so-small influence of the impedance of the DCS path on the transmitting characteristics of this mode and thus on generated harmonics. However, because a positive voltage is applied from a control circuit VC3, too, the PCS RX (RX3) is put in an ON state in the control logic of the present invention, so that impedance of 50 Ω appears not in the DCS path but in the PCS RX path. Thus, the impedance of the PCS path affects the transmitting characteristics for the same reasons as above. Because impedance or phase is in a better condition in the PCS path than in the DCS path, harmonics are suppressed (the attenuation of a second harmonic increases).

It has been found that the adjustment of the transmission line LD2 is effective to increase the attenuation of a second harmonic. The reason why impedance matching is easier in the PCS path than in DCS path is that it looks as if the DCS receiving terminal is directly connected to the DCS RX receiving terminal from the antenna terminal via transmission lines as described above. Namely, because only the length and width of lines are adjustable, there is only a narrow adjustable range, provided that the line length is λ/4 and that the impedance is substantially 50 Ω. Even if the length and width of lines are adjusted to some extent, the addition of elements such as capacitors, etc. largely affects the DCS receiving characteristics, like the increase of a transmission loss and the deterioration of isolation. On the other hand, because the PCS path is adjusted mainly in the transmission line LD2, which is not a transmitting line but a parallel line, the adjustment of its length and width to change the impedance of a second harmonic band of GSM viewed from the antenna terminal has only small influence on the PCS receiving characteristics. Specifically, when the transmission line LD2 is made longer, the impedance of a second harmonic band of GSM viewed from the antenna terminal rotates counterclockwise in a Smith chart. Also, when it is made narrower, the impedance nears a center of the Smith chart. Of course, the reversing of an adjusting direction results in the reverse change of impedance. It has been found that their combination enables fine adjustment of impedance of a second harmonic band of GSM viewed from the antenna terminal. In addition, the adjustment of impedance can be achieved not only by changing the transmission lines, but also by changing the inductors, etc. In this case, though the adjustment of impedance in a radial direction in the Smith chart can be achieved, only slight adjustment is achieved in a phase rotation direction. Accordingly, rotation adjustment should be supplemented by the adjustment of capacitors, etc. The rotation adjustment may also be achieved by changing the parameters of the transmission line LP2.

[1] First Embodiment

Figure 5:
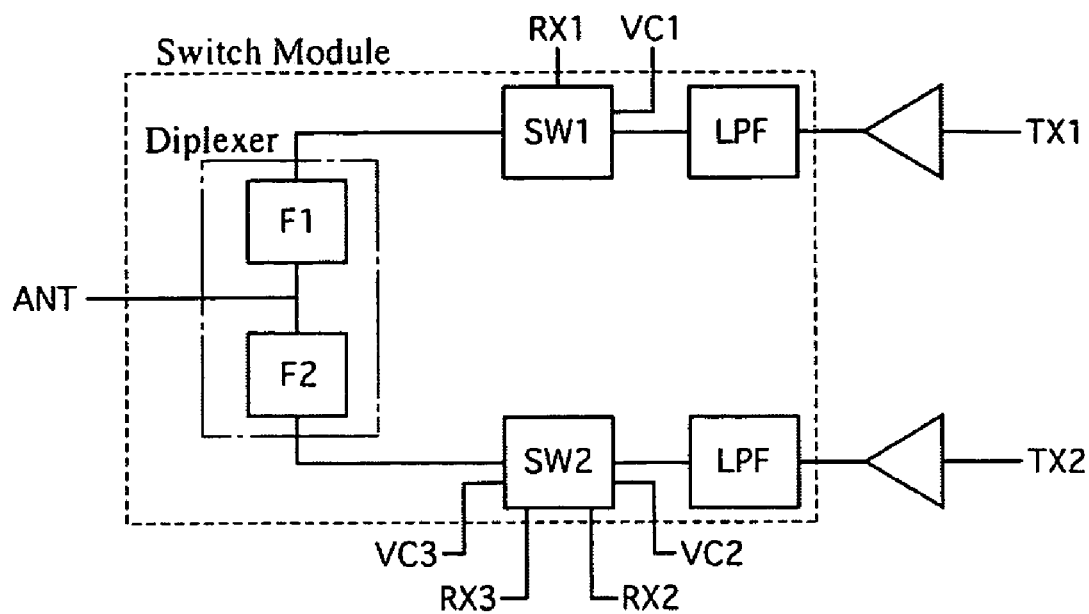
FIG. 5 is a block diagram showing a conventional triple-band high-frequency switching module.
Figure 6:
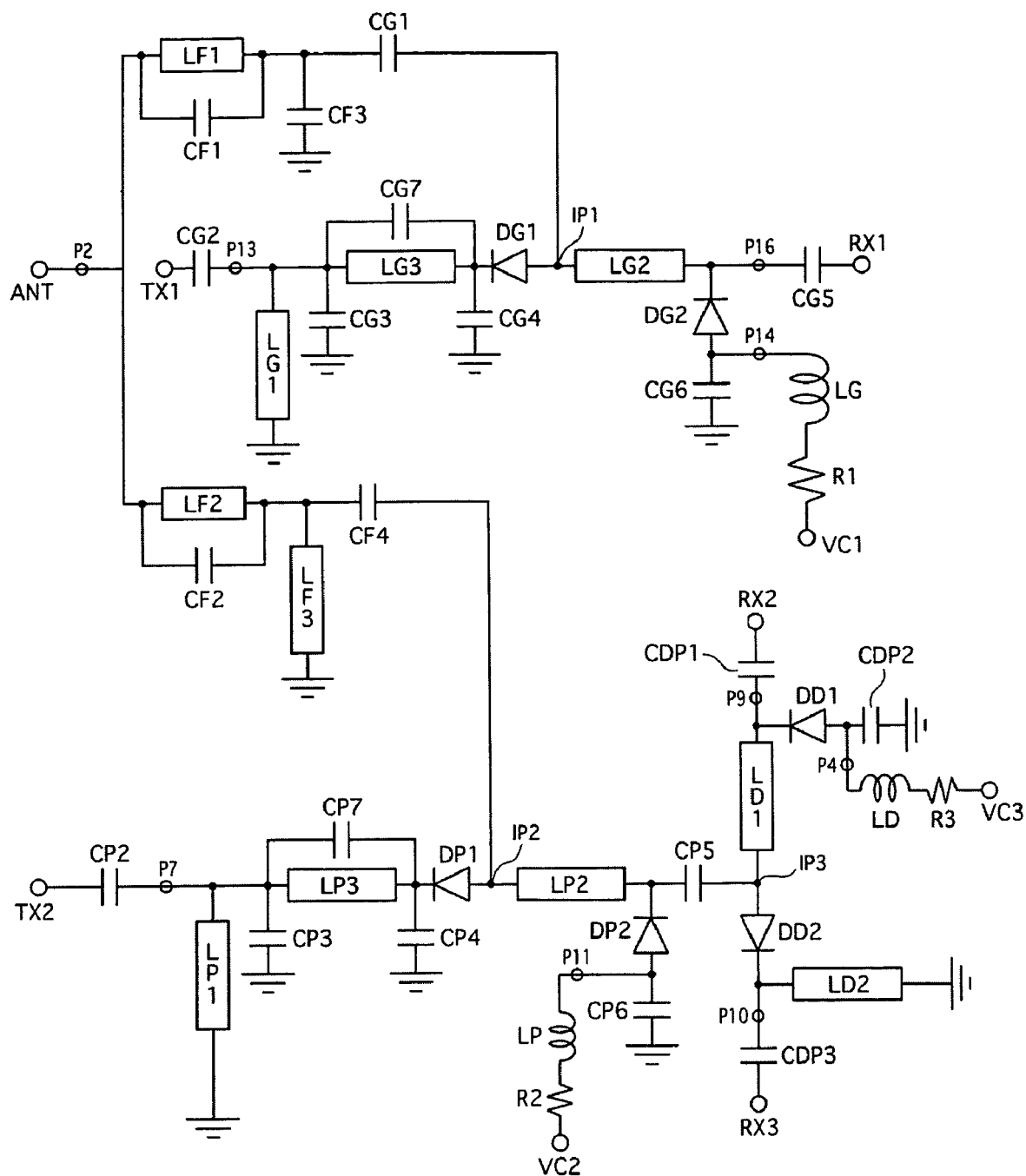
FIG. 6 is a view showing a circuit of an example of conventional high-frequency switching modules.

FIG. 1 is a view showing an equivalent circuit of the high-frequency switching module shown in FIG. 5, and FIG. 2 is a graph showing the attenuation of a second harmonic in the high-frequency switching module of FIG. 1. The same reference numerals are assigned to the same parts as in FIG. 6, and explanation will be concentrated on different portions.

In FIG. 1, a diplexer Dip comprising a first filter circuit F1 and a second filter circuit F2 is constituted by transmission lines LL1-LL3, a capacitor CL1, a transmission line LH1, and capacitors CH1-CH3. The transmission line LL2 and the capacitor CL1 constitutes a series-resonated circuit having a resonance frequency in a DCS band (transmitting frequency: 1710-1785 MHz, receiving frequency: 1805-1880 MHz) and a PCS band (transmitting frequency: 1850-1910 MHz, receiving frequency: 1930-1990 MHz). In this embodiment, an attenuation peak of both bands lies at 1.8 GHz. The transmission line LH1 and the capacitor CH1 constitutes a series-resonated circuit having a resonance frequency in an EGSM band (transmitting frequency: 880-915 MHz, receiving frequency: 925-960 MHz). In this embodiment, an attenuation peak of both bands lies at 0.9 GHz. This circuit can divide or combine an EGSM signal and a DCS/PCS signal. The transmission lines LL1, LL3 preferably have such length that they have high impedance at a frequency of the DCS/PCS signal. This makes it hard for the DCS/PCS signal to flow into the EGSM path. The transmission line LL3 may be omitted. The capacitors CH2, CH3 preferably have relatively small capacitance to provide high impedance at a frequency of the EGSM signal. This makes it hard for the EGSM signal to flow into the DCS/PCS path. The capacitor CH3 acts as a capacitor CF4 shown in FIG. 6.

The first switching circuit SW1 is constituted by capacitors CG1, CG6, transmission lines LG1, LG2, diodes DG1, DG2, and a resistor R1. The transmission lines LG1, LG2 have such length as to act as a λ/4 resonator in a transmitting frequency band of EGSM. The transmission line LG1 may be replaced by such a choke coil as to provide an open ground level (high impedance) at a transmitting frequency of EGSM. In this case, the inductance of the choke coil is preferably about 10-100 nH. The resistor R1 determines current supplied to the first and second diodes DG1, DG2 when the control circuit VC1 is high. In this embodiment, the resistor R1 is preferably 100-200 Ω. The capacitors CG1, CG6 are necessary to cut a DC component from a control power supply. There is parasitic inductance in the diode DG2 due to connecting wires, etc. when the control circuit VC1 is high. To cancel the parasitic inductance, the diode DG2 is series-resonated to the capacitor CG6. The CG6 may have properly set capacitance.

The second switching circuit SW2 is constituted by capacitors CP5, CP6, CP9, CDP2, transmission lines LP1, LP2, LD1, LD2, diodes DP1, DP2, DD1, DD2, and resistors R2, R3. The transmission lines LP1, LP2, LD1, LD2 have such length as to constitute a λ/4 resonator at a frequency of a DCS/PCS signal. Each transmission line LP1, LD2 may be replaced by such a choke coil as to provide an open ground level (high impedance) at the transmitting frequencies of DCS and PCS. In this case, the inductance of the choke coil is preferably about 5-60 nH. The resistor R2 determines current supplied to the third and fourth diodes DP1, DP2 when the control circuit VC2 is high. In this embodiment, the resistor R2 is preferably 100-200 Ω. The resistor R3 determines current supplied to the fifth and sixth diodes DD1, DD2 when the control circuit VC3 is high. In this embodiment, the resistor R3 is preferably 100 Ω to 2 kΩ. The capacitors CP6, CP5, CDP2 are necessary to cut a DC component from the control power supply. Because there is parasitic inductance in the diode DP2 due to connecting wires, etc. when the control circuit VC2 is high, the capacitance of CP6 is determined to obtain series-resonance with the capacitor CP6.

The diodes DG1, DG2, DP1, DP2 may be those consuming current of about 8 mA, but the diodes DD1, DD2 in a receiving path through which large-power current does not flow are preferably those with as low electricity consumption as 1 mA or less, for instance, about 0.8 mA.

The first lowpass filter LPF1 is a π-lowpass filter constituted by a transmission line LG3 and capacitors CG3, CG4, CG7. The transmission lines LG3 and CG7 preferably constitute a parallel resonance circuit having a resonance frequency 2 or 3 times the transmitting frequency of EGSM. In this embodiment, the resonance frequency is 2.7 GHz, 3 times the transmitting frequency of EGSM. With the above structure, harmonic distortion is removed from a transmitting signal of EGSM input from a power amplifier.

In the depicted embodiment, the first lowpass filter LPF1 exists between the first diode DG1 and the transmission line LG1 in the first high-frequency switching circuit SW1, but it may be disposed between the diplexer Dip and the first high-frequency switching circuit SW1, or between the transmission line LG1 and the transmitting terminal Tx1 of EGSM. The arrangement of grounded capacitors CG3, CG4 in the first lowpass filter LPF1 in parallel with a transmission line LG1 constitutes a parallel resonance circuit, making the transmission line LG1 shorter than λ/4, and providing the choke coil with smaller inductance.

The second lowpass filter LPF2 is a π-lowpass filter constituted by a transmission line LP3 and capacitors CP3, CP4, CP7. The transmission line LP3 and the capacitor CP7 constitute a parallel resonance circuit having a resonance frequency 2 or 3 times the transmitting frequency of DCS/PCS. In this embodiment, the resonance frequency is 3.6 GHz, 2 times the transmitting frequency of DCS/PCS. With the above structure, harmonic distortion is removed from the transmitting signal of DCS/PCS input from the power amplifier.

In the depicted embodiment, the second lowpass filter LPF2 exists between a diode DP1 and a transmission line LP1 in the second high-frequency switching circuit SW2, but it may be disposed between the diplexer Dip and the second high-frequency switching circuit SW2 like the first lowpass filter LPF1, or between the transmission line LP1 and the transmitting terminal Tx2 of DCS/PCS.

The above arrangement of the first and second lowpass filters LPF1, LPF2 is preferable from the aspect of circuit design, but it is not indispensable. The lowpass filter need only exist between the diplexer and the transmitting terminal, through which a transmitting signal passes.

The EGSM system may be further divided to GSM850 (transmitting frequency: 824-849 MHz, receiving frequency: 869-894 MHz) and EGSM as a quadruple band. In this case, the transmitting system may have a common terminal, and the receiving system may comprise a switch for GSM850 and EGSM receiving terminal in the triple-band antenna switch. A quadruple band can also be achieved by using transmission lines corresponding to λ/4 resonators of the bands of GSM850 and EGSM in place of the switch to divide their frequencies. In this case, too, the control method of the present invention provides the same effects.

In the high-frequency switching module in this embodiment, the control logic of a diode switch by the first to third control circuits VC1-VC3 is the same as the conventional control logic shown in Table 1 in the cases of (A) a DCS/PCS TX mode, (B) a DCS RX mode, (C) a PCS RX mode, and (D) an EGSM RX mode, but different in the case of (E) an EGSM TX mode. Thus, explanation will be omitted on the modes (A)-(D), and only the EGSM TX mode will be explained in detail.

In the EGSM TX mode, when the first transmitting circuit TX1 is connected to the first filter circuit F1, a positive voltage is applied from the control circuit VC1. The positive voltage is deprived of a DC component by capacitors CG6, CG5, CG4, CG3, CG2 and CG1, and applied to a circuit comprising diodes DG2 and DG1. The diodes DG2 and DG1 are thus turned on. With the diode DG1 turned on, impedance is lowered between the first transmitting circuit TX1 and the input/output terminal IP1. With the diode DG2 and the capacitor CG6 in an ON state, the transmission line LG2 is grounded at high frequencies and thus resonated, resulting in extremely large impedance when the first receiving circuit RX1 is viewed from the input/output terminal IP1. As a result, the transmitting signal from the first transmitting circuit TX1 is transmitted to the first filter circuit F1 without leaking to the first receiving circuit RX1.

A positive voltage is applied not only from the control circuit VC1 but also from the control circuit VC3. At this time, the voltage of the control circuit VC2 remains zero. The positive voltage applied from the control circuit VC3 turns on the diodes DD1 and DD2. With the diodes DP1, DP2 still in an OFF state, the same operation as in the PCS RX mode is conducted. However, the receiving signal from the second filter circuit F2 is not originally transmitted here. The above control logic is summarized in Table 2.

TABLE 2

| Mode | VC1 | VC2 | VC3 |
| --- | --- | --- | --- |
| EGSM TX (Transmitting) | High | Low | High |
| DCS/PCS TX (Transmitting) | Low | High | Low (High) |
| EGSM RX (Receiving) | Low | Low | Low |
| DCS RX (Receiving) | Low | Low | Low |
| PCS RX (Receiving) | Low | Low | High |

At the EGSM TX mode, a positive voltage is applied from the control circuits VC1 and VC3 to put it in a high state. Thus, the control of two control circuits in one control mode increases the turned-on diodes, thereby more suppressing harmonics. Namely, at the EGSM TX mode, a transmitting signal from the power amplifier (sometimes called "high-power amplifier") is radiated from the antenna ANT via the diplexer Dip, but part of the signal is likely to leak to the second switching circuit SW2 to distort the diodes (DP1, DP2, DD1, DD2) in an OFF state, resulting in the generation of harmonic noises. Though distortion can be eliminated by turning on all diodes, harmonic noises leaking from the power amplifier may pass through different paths to be radiated from the antenna. Thus, with diodes DD1 and DD2 with lower electricity consumption among those constituting the second switching circuit SW2 placed in an ON state, harmonic noises caused by the distortion of diodes can be suppressed.

Figure 2A:
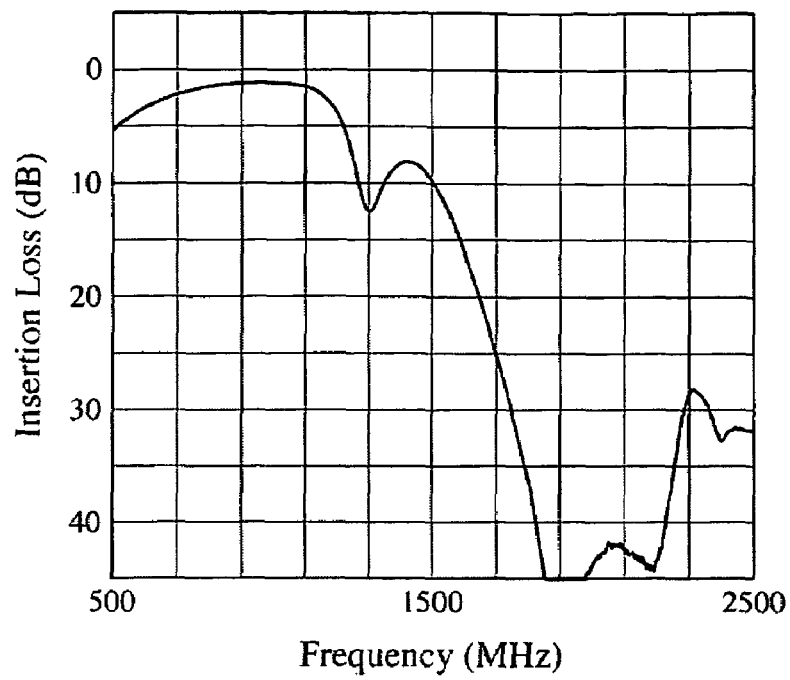
FIG. 2(a) is a graph showing the attenuation of a second harmonic at an EGSM TX mode in the control logic of the present invention.
Figure 2B:
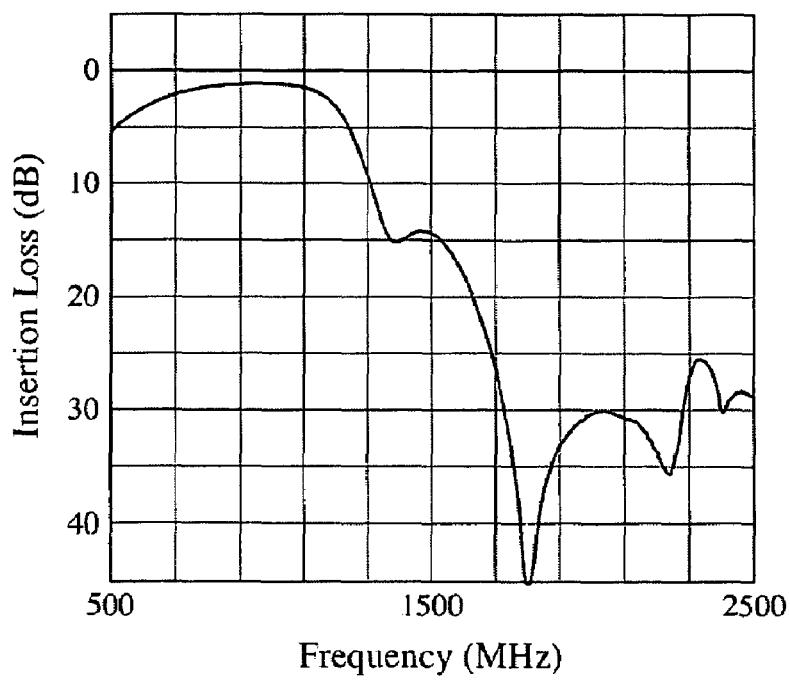
FIG. 2(b) is a graph showing the attenuation of a second harmonic at an EGSM TX mode in a conventional control logic.

The PCS RX mode is in a high state at the EGSM TX mode, which is desirable from the aspect of adjusting impedance. Thus, the attenuation of a second harmonic increases in the entire high-frequency switching module. FIG. 2(a) shows the attenuation of a second harmonic at an EGSM TX mode when the control logic of the present invention is used, and FIG. 2(b) shows the attenuation of a second harmonic at the EGSM TX mode when the conventional control logic is used. Particularly in a higher region of the second harmonic band, the attenuation is about −40 dB in the conventional control logic [FIG. 2(b)], but it is about −50 dB in the control logic of the present invention [FIG. 2(a)].

The control logic VC3 at the DCS/PCS TX mode may have a high state shown in parentheses in Table 2, because the second control circuit VC3 is sometimes turned on at the DCS/PCS TX mode to increase the isolation of the DCS RX path from the DCS/PCS TX terminal. This makes the impedance of the DCS RX path (second receiving circuit RX2) viewed from the output terminal IP3 extremely high. As a result, a transmitting signal sent from the DCS/PCS TX terminal (second transmitting circuit TX2) is transmitted to the second filter circuit F2 without leaking to the DCS RX path (second receiving circuit RX2), and radiated from the antenna ANT. Because the PCS TX band and the DCS RX band partially overlap in a triple-band antenna switching circuit, It is important that the DCS RX path is isolated from the DCS/PCS TX terminal.

[2] Second Embodiment

Because of large demand to make cell phones smaller and lighter in weight, pluralities of parts are integrated into a module. The above high-frequency switching module can be used as a so-called triple-band antenna switching module with one common antenna for switching three transmitting/receiving systems or a quadruple-band antenna switching module. In this case, it is preferable to form the LC circuits of the diplexer, the LC circuit of the lowpass filter and the transmission lines of the switching circuits by electrode patterns on dielectric green sheets, laminate pluralities of the green sheets with electrode patterns to form a laminate, and mount chip elements such as diodes, LC circuit parts, etc. on the laminate to form a one-chip part.

In this embodiment, the above high-frequency switching module (antenna switching module) and a high-power amplifier (high-frequency amplifier) are integrally formed into a module. The high-power amplifier consuming most of DC power is required to have a high DC-RF power conversion efficiency (power-added efficiency) and be small. In this case, too, the above control logic can be used, because the reduction of an insertion loss and the increase of the attenuation of harmonics are important for higher efficiency.

Figure 3:
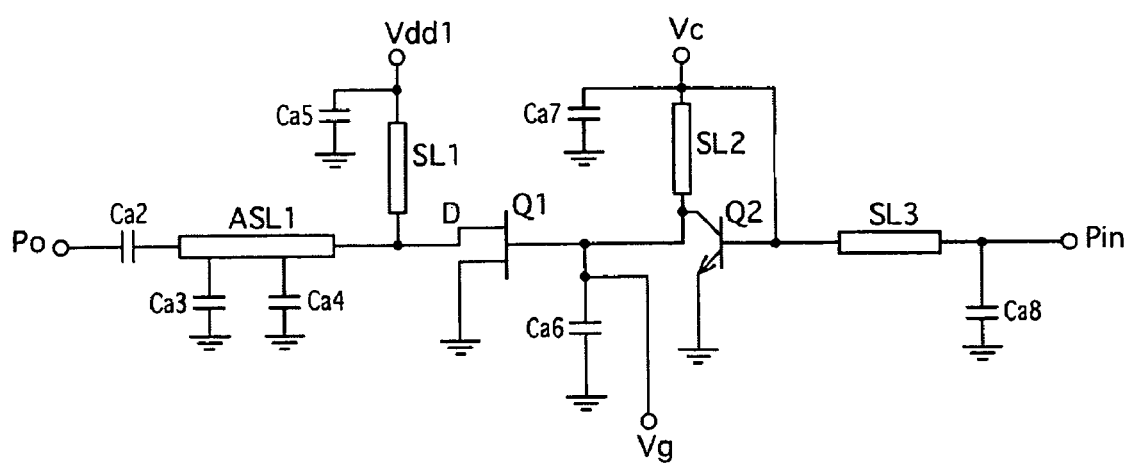
FIG. 3 is a view showing an equivalent circuit of an example of power amplifier circuits.

FIG. 3 shows a circuit of a high-power amplifier. For instance, an output terminal P0 of a matching circuit in the high-frequency amplifier is connected to a transmitting terminal P1 of EGSM Tx in the antenna switching module shown in FIG. 1, so that an amplified transmitting signal is sent to the antenna switching circuit. One end of a transmission line ASL1 is connected to the output terminal P0 via a DC-cutting capacitor Ca2. Capacitors Ca3, Ca4 having grounded ends are connected to the transmission line ASL1 to constitute an output matching circuit. The other end of the transmission line ASL1 is connected to a drain D of a switching field effect transistor (FET) Q1, one of semiconductor elements. The FET Q1 has a grounded source, and a gate connected to a collector of a switching bipolar element (B-Tr) Q2.

A connecting point of the other end of the transmission line ASL1 and the drain D of the switching field effect transistor FET Q1 is grounded via a series circuit comprising an inductance element SL1 formed by a λ/4 strip line, etc. and a capacitor Ca5, and a connecting point of the inductor SL1 and the capacitor Ca5 is connected to a drain voltage terminal Vdd1. A connecting point of the gate of the switching field effect transistor FET Q1 and the collector of the switching bipolar element (B-Tr) Q2 is grounded via a capacitor Ca6, and connected to a gate voltage terminal Vg.

The switching bipolar element Q2 has a grounded emitter and a base connected to one end of the transmission line SL3. The collector of the switching bipolar element Q2 is grounded via a series circuit comprising an inductor SL2 formed by a strip line, etc. and a capacitor Ca7, and a connecting point of the inductor SL2 and the capacitor Ca7 is connected to a collector voltage terminal Vc. A connecting point of the inductor SL2 and the capacitor Ca7 is also connected to a connecting point of the base of the switching bipolar element Q2 and one end of the transmission line SL3. The other end of the transmission line SL3 is grounded via a capacitor Ca8, and connected to an input terminal Pin.

In the equivalent circuits shown in FIGS. 1 and 3, transmission lines and inductors are mostly constituted by strip lines, but they may be constituted by microstrip lines, coplanar guidelines, etc. The transistor Q1 is an FET, and the transistor Q2 is a B-Tr, but they may be other transistors such as Si-MOSFETs, GaAs FETs, Si bipolar transistors, GaAs hetero-junction bipolar transistors (HBTs), high-electron-mobility transistors (HEMTs), etc. Of course, monolithic microwave integrated circuits (MMICs), in which pluralities of transistors are integrated, may be used. Though the transmission line SL3 is directly connected to the transistor Q2 in this embodiment, they may be connected via a resistor.

Figure 4:
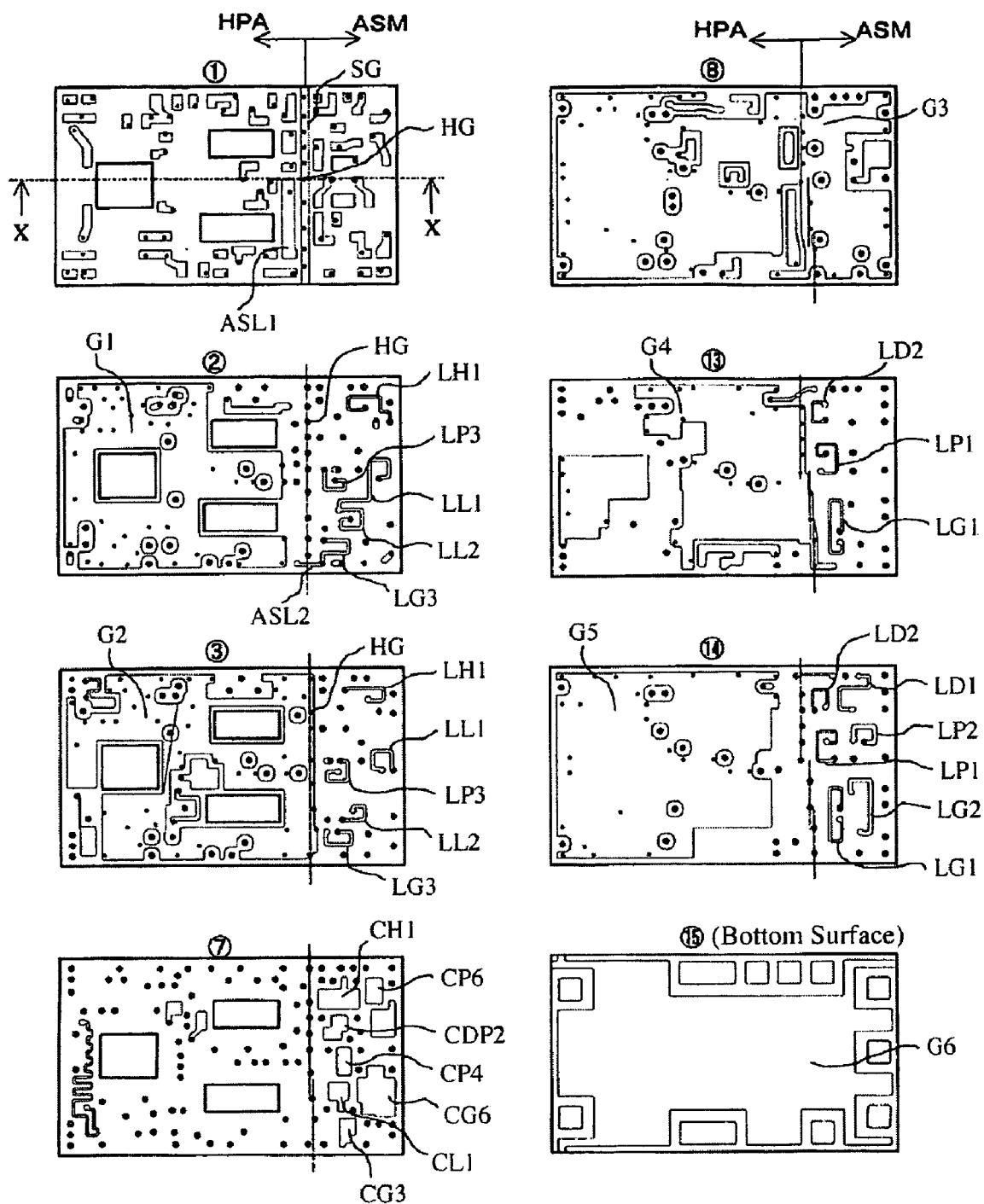
FIG. 4 is an exploded plan view showing green sheets for an example of laminates constituting the high-frequency switching module of the present invention.

FIG. 4 shows dielectric green sheets in upper first to third layers, intermediate seventh to eighth layers, and lower 13th to 15th layers, in a laminate module having 15 layers in total, which comprises the antenna switching module shown in FIG. 1 and the power amplifier shown in FIG. 3. A sheet (1) is an uppermost layer, and a sheet (15) is a lowermost layer (bottom surface).

The dielectric green sheet is preferably made of low-temperature-cofirable ceramics (LTCC) sinterable at 950° C. or lower. The dielectric composition preferably comprises, for instance, 10-60% by mass (calculated as $Al_2O_3$) of Al, 25-60% by mass (calculated as $SiO_2$) of Si, 7.5-50% by mass (calculated as SrO) of Sr, and 20% or less by mass (calculated as $TiO_2$) of Ti as main components, and 0.1-10% by mass (calculated as $Bi_2O_3$) of Bi, 0.1-5% by mass (calculated as $Na_2O$) of Na, 0.1-5% by mass (calculated as $K_2O$) of K, 0.01-5% by mass (calculated as CuO) of Cu, and 0.01-5% by mass (calculated as $MnO_2$) of Mn, per 100% by mass of the main components.

The green sheets are preferably as thick as 40-200 μm in order that transmission lines and capacitors are easily formed. The electrode patterns are preferably formed by a silver paste. Electrode patterns for transmission lines and capacitors are formed on the green sheets, and via-holes are properly formed in the green sheets to constitute a circuit. The green sheets with electrode patterns are successively laminated and press-bonded, and sintered, for instance, at 950° C. to obtain a laminate module comprising high-frequency parts. The laminate is substantially as large as 10 mm in width, 8 mm in length and 0.75 mm in height. After mounting chip elements such as diodes, transistors and chip inductors, chip capacitors, resistors, etc. onto an upper surface of the laminate, the laminate is covered with a metal casing (not shown). The finished product is as high as about 1.8 mm, for instance. The laminate may be sealed by a resin package in place of the metal casing, and the total height is, for instance, about 1.5 mm in this case.

With respect to the antenna switching module part in the laminate, electrode patterns for the transmission lines LL1, LL2, LL3, LH1, etc. constituting the diplexer and the lowpass filter are formed mainly on upper layers, electrode patterns for the capacitors CL1, CH1, CG6, CDP2, etc. constituting the diplexer, the switching circuits and the lowpass filters are formed mainly on intermediate layers, and electrode patterns for the transmission lines LG1, LG2, LP1, LP2, LD2, LD1, etc. constituting the switching circuits are formed mainly on lower layers. With respect to the high-frequency amplifier, electrode patterns for transmission lines constituting the first-stage matching circuit are formed mainly on upper layers, electrode patterns for capacitors constituting the first- and last-stage matching circuits are formed mainly on intermediate layers, and electrode patterns for the thermal-vias, transmission lines of the last-stage matching circuit, and voltage-supplying lines are formed mainly on lower layers. Ground electrodes G1, G2, G3, G4, G5 and G6 are formed on the second, third, eighth, 13th, 14th and 15th layers. It should be noted that FIG. 4 does not show all ground electrodes, transmission lines and capacitors. Parts mounted onto the laminate are, as described above, diodes DG1-DD2, transistors Q1-Q3, chip capacitors CG1, CP5, Ca5-Ca7, resistors R1-R3, etc.

The connected portion of the high-frequency amplifier and the antenna switching module is formed on upper layers. To avoid mutual interference, the transmission line ASL1 (line for the power amplifier) on the green sheet 1 and the transmission line ASL2 (lead of the antenna switching module) on the green sheet 2 are formed on different green sheets and arranged such that they do not vertically overlap. A phase-matching highpass filter exists between them in this embodiment, and its LC circuit is constituted by chip inductors and chip capacitors mounted onto the upper surface of the laminate, so that phase matching can be carried out even after forming the laminate module.

As shown in FIG. 4, all laminated green sheets are divided to two regions in this laminate module, such that electrode patterns constituting the power amplifier are formed in a left region, and that electrode patterns constituting the antenna switching module are formed in a right region. A line of shield electrodes SG are formed between the right and left regions on the first layer, and a line of through-hole electrodes HG are formed in all green sheets in alignment with the shield electrodes SG in a lamination direction. The through-hole electrodes HG are connected from the shield electrodes SG to the ground electrode G2 on the third layer, to the ground electrode G3 on the eighth layer, to the ground electrode G4 on the thirteenth layer, and to the ground electrode G6 on the lowermost layer, to suppress mutual interference between both high-frequency parts, and between electrode patterns arranged vertically.

In the above module, mutual interference such as noises, etc. is suppressed between the high-frequency parts by the shielding effect of the shielding electrodes SG and/or ground electrodes and the through-hole electrodes HG, thereby making it possible to prevent the unstable operation such as oscillation, etc. of the power amplifier. In addition, it is possible to suppress spurious signals from being generated from necessary signals (transmitting signals) and unnecessary signals, thereby preventing the deterioration of transmitting characteristics. Further, because the high-frequency parts are integrated in one laminate, an area occupied by the laminate can be reduced by about 50%, as compared with a conventional case where power amplifiers and antenna switches are separately mounted onto a circuit board. Therefore, the high-frequency module of the present invention is suitable for communications devices mounted in small information terminals such as cell phones, etc.

Though the embodiments of the present invention have been explained referring to the drawings, the present invention is not restricted thereto, and various modifications may be added within the scope of the present invention. For instance, the polarity of the diodes in FIG. 1 may be reversed to conduct switching control by a negative control voltage. Also, the transmission lines may be replaced by chip elements as long as their characteristics and mounting areas are secured.

Though the semiconductor chip of the high-frequency amplifier has a function of monitoring the output power in the above embodiments, the output power may be detected by a coupler circuit. Namely, a coupler circuit or an isolator circuit may be disposed between the antenna switching module and the high-frequency amplifier. Alternatively, a SAW filter may be inserted into the receiving path to remove unnecessary frequency components from the receiving signal passing through the antenna ANT, so that only necessary components are sent to the low-noise amplifier. The SAW filter may be mounted onto the laminate module.

The present invention is applicable, in addition to the above, to triple-band antenna switching circuits combining a PDC800 band (810-960 MHz), a GPS band (1575.42 MHz), a PHS band (1895-1920 MHz), a Bluetooth band (2400-2484 MHz), CDMA2000 expected to widely spread in the U.S., TD-SCDMA expected to widely spread in China, W-CDMA expected to widely spread in Europe, etc.

Effect and Applicability of the Invention

Because the high-frequency switching module and its control method according to the present invention conduct the selection of one mode by voltage applied from control circuits of two switching circuits, it enjoys a large attenuation of harmonics generated by a power amplifier, and suppresses harmonics that are likely to be generated in the high-frequency switching module. The combination of the antenna switching module of the present invention and the power amplifier connected to a common antenna in and on a laminate provides small, lightweight laminate modules for wireless communications equipments such as cell phones, etc.

The high-frequency switching module and its control method according to the present invention advantageously utilize the impedance-matching characteristics of diode switches, thereby achieving a high attenuation level of harmonics. The combination of the parts of the high-frequency switching module with or without the parts of the high-frequency amplifier in or on one laminate provides a small, lightweight, highly integrated laminate module useful for mobile communications equipments such as cell phones, etc.

What is claimed:

1. An method for controlling a high-frequency switching-module comprising a diplexer comprising first and second filter circuits F1, F2 for dividing signals received by an antenna to a receiving signal of a first transmitting/receiving system and a receiving signal of second and third transmitting/receiving systems, a first switching circuit SW1 disposed downstream of said first filter circuit F1 for switching a transmitting circuit TX1 and a receiving circuit RX1 of said first transmitting/receiving system by voltage applied from a control circuit VC1, and a second switching circuit SW2 disposed downstream of said second filter circuit F2 for switching a transmitting circuit TX2 of said second and third transmitting/receiving systems, a receiving circuit RX2 of said second transmitting/receiving system and a receiving circuit RX3 of said third transmitting/receiving system by voltage applied from control circuits VC2, and VC3 wherein the transmitting circuit TX1 of said first transmitting/receiving system in said first switching circuit SW1 is connected to said antenna by applying a positive voltage from said control circuit VC1, and further at the same time by applying a positive voltage from said control circuit VC3 in controlling a switch circuit of said high-frequency switching module for switching a second receiving circuit RX2 and a third receiving circuit RX3 by voltage applied from said control circuit VC3.

2. A high-frequency switching module comprising a diplexer comprising first and second filter circuits F1, F2 for dividing signals received by an antenna to a receiving signal of a first transmitting/receiving system and a receiving signal of second and third transmitting/receiving systems, a first switching circuit SW1 disposed downstream of said first filter circuit F1 for switching a transmitting circuit TX1 and a receiving circuit RX1 of said first transmitting/receiving system by voltage applied from a control circuit VC1, and a second switching circuit SW2 disposed downstream of said second filter circuit F2 for switching a transmitting circuit TX2 of said second and third transmitting/receiving systems, a receiving circuit RX2 of said second transmitting/receiving system and a receiving circuit RX3 of said third transmitting/receiving system by voltage applied from control circuits VC2 and VC3;

said first switching circuit SW1 comprising an input/output terminal IP1 for inputting a receiving signal of said first transmitting/receiving system and outputting a transmitting signal, a connecting terminal P13 for inputting a transmitting signal from the transmitting circuit TX1 of said first transmitting/receiving system, a connecting terminal P16 for outputting a receiving signal of the first transmitting/receiving system to a receiving circuit RX1, a first diode DG1 disposed between said input/output terminal IP1 and said connecting terminal P13, a first inductance element LG1 disposed between said connecting terminal P13 and a ground, a second inductance element LG2 disposed between said input/output terminal IP1 and said connecting terminal P16, and a second diode DG2 disposed between said connecting terminal P16 and the ground;

said second switching circuit SW2 comprising an input/output terminal IP2 for inputting a receiving signal of said second and third transmitting/receiving systems and outputting a transmitting signal, a connecting terminal P7 for inputting a transmitting signal from a transmitting circuit TX2 of the second and third transmitting/receiving systems, an output terminal IP3 for outputting a receiving signal of the second and third transmitting/receiving systems, a connecting terminal P9 for outputting a receiving signal of the second transmitting/receiving system to a receiving circuit RX2, a connecting terminal P10 for outputting a receiving signal of said third transmitting/receiving system to a receiving circuit RX3, a third diode DP1 disposed between said input/output terminal IP2 and said connecting terminal P7, a third inductance element LP1 disposed between said connecting terminal P7 and the ground, a fourth inductance element LP2 disposed between said input/output terminal IP2 and said output terminal IP3, a fourth diode DP2 disposed between said output terminal IP3 and the ground, a fifth inductance element LD1 disposed between said output terminal IP3 and said connecting terminal P9, a fifth diode DD1 disposed between said connecting terminal P9 and the ground, a sixth diode DD2 disposed between said output terminal IP3 and a connecting terminal P10, and a sixth inductance element LD2 disposed between said connecting terminal P10 and the ground; and the transmitting circuit TX1 of said first transmitting/receiving system being connected to said input/output terminal IP1 by turning on said first diode DG1, said second diode DG2, said fifth diode DD1 and said sixth diode DD2.

3. The high-frequency switching module according to claim 2, wherein the impedance of said antenna terminal near a frequency band of the receiving circuit RX3 is adjusted by changing the constant of said sixth inductance element LD2, and the impedance of the receiving circuit RX3 of said third transmitting/receiving system.

4. The high-frequency switching module according to claim 2, wherein said diplexer is constituted by an LC circuit; wherein said first and second switching circuits are constituted by switching elements; wherein each transmitting part of said switching circuits comprises a lowpass filter constituted by an LC circuit; wherein at least part of the LC circuit of said diplexer, the LC circuit of said lowpass filter and inductance elements of said switching circuits are constituted by electrode patterns formed on dielectric layers forming a laminate; and wherein chip elements constituting part of said switching elements and said LC circuits are mounted onto said laminate.

5. The high-frequency switching module according to claim 4, wherein it further comprises a high-frequency amplifier integrally formed in said laminate; said high-frequency amplifier comprising at least a semiconductor element, a voltage-supplying circuit and a matching circuit; at least part of inductance elements constituting said voltage-supplying circuit and said matching circuit and LC circuits being constituted by electrode patterns formed on said dielectric layers; and chip elements constituting part of said semiconductor elements and said LC circuits being mounted onto said laminate.

6. The high-frequency switching module according to claim 3, wherein said diplexer is constituted by an LC circuit; wherein said first and second switching circuits are constituted by switching elements; wherein each transmitting part of said switching circuits comprises a lowpass filter constituted by an LC circuit; wherein at least part of the LC circuit of said diplexer, the LC circuit of said lowpass filter and inductance elements of said switching circuits are constituted by electrode patterns formed on dielectric layers forming a laminate; and wherein chip elements constituting part of said switching elements and said LC circuits are mounted onto said laminate.

7. The high-frequency switching module according to claim 6, wherein it further comprises a high-frequency amplifier integrally formed in said laminate; said high-frequency amplifier comprising at least a semiconductor element, a voltage-supplying circuit and a matching circuit; at least part of inductance elements constituting said voltage-supplying circuit and said matching circuit and LC circuits being constituted by electrode patterns formed on said dielectric layers; and chip elements constituting part of said semiconductor elements and said LC circuits being mounted onto said laminate.

* * * * *